United States Patent
Fogarty

[11] Patent Number: 6,113,375
[45] Date of Patent: Sep. 5, 2000

[54] THERMOPLASTIC FOAM EXTRUSION ASSEMBLY

[76] Inventor: James Fogarty, 4970 Alfresco St., Boca Raton, Fla. 33428

[21] Appl. No.: 09/188,753

[22] Filed: Nov. 9, 1998

[51] Int. Cl.$^7$ .................................................. B29C 47/64
[52] U.S. Cl. ........................... 425/4 C; 425/208; 425/209; 425/378.1
[58] Field of Search .................................... 425/4 C, 208, 425/209, 378.1

[56] References Cited

U.S. PATENT DOCUMENTS

| | | | |
|---|---|---|---|
| 3,782,870 | 1/1974 | Schippers ................................ | 425/4 C |
| 3,787,542 | 1/1974 | Gallagher et al. ...................... | 425/4 C |
| 3,827,841 | 8/1974 | Kawai et al. ............................ | 425/4 C |
| 3,856,442 | 12/1974 | Gallagher et al. ..................... | 425/4 C |
| 4,099,897 | 7/1978 | Takano et al. .......................... | 425/4 C |
| 4,107,260 | 8/1978 | Dougherty ............................. | 264/46.1 |
| 4,185,060 | 1/1980 | Ladney, Jr. .............................. | 425/208 |
| 4,302,409 | 11/1981 | Miller et al. ............................ | 425/4 C |
| 4,376,741 | 3/1983 | Stenzel .................................... | 425/208 |
| 4,388,262 | 6/1983 | Brasz et al. ............................. | 425/208 |
| 4,431,311 | 2/1984 | Kolossow ................................ | 425/208 |
| 4,454,087 | 6/1984 | Hayashi et al. ......................... | 425/4 C |
| 4,746,478 | 5/1988 | Fujisaki et al. ......................... | 425/208 |
| 4,940,329 | 7/1990 | Dienst .................................... | 425/208 |
| 5,234,324 | 8/1993 | Kawabata ............................... | 425/208 |
| 5,288,223 | 2/1994 | Toro ........................................ | 425/208 |
| 5,630,968 | 5/1997 | Wang et al. ............................. | 264/53 |

FOREIGN PATENT DOCUMENTS

| | | | |
|---|---|---|---|
| 25 41 376 | 5/1976 | Germany ................................ | 425/208 |
| 52-4586 | 2/1977 | Japan ...................................... | 425/208 |
| 2 112 701 | 7/1983 | United Kingdom ................... | 425/208 |

*Primary Examiner*—Allan R. Kuhns
*Attorney, Agent, or Firm*—Malloy & Malloy, P.A.

[57] ABSTRACT

A foam extrusion assembly having a melt region which receives and melts a plurality of material pellets, an agent addition assembly which adds a foaming agent to the melted material pellets, and a mixing assembly which substantially mixes the melted material pellets and the foaming agent with one another. The mixing assembly includes a generally elongate barrel through which the melted material pellets and the foaming agent are urged generally from an inlet to an outlet of the barrel. Furthermore, the mixing assembly includes a mixing plug disposed in the barrel and structured to define at least two sequentially disposed flow passages along a length thereof, the flow passages, which are structured and disposed to receive the melted material pellets and the foaming agent therethrough so as to define a flow path past the mixing plug, each have at least one substantially small transverse dimension so as to restrict amounts of the melted material pellets and the foaming agent which enter the flow passage at one time, and are generally short in length so as to minimize a duration of a flow restriction at the flow passages. As a result a well homogenized extrusion mixture is provided and is passed at an extrusion temperature through a die which forms the extruded foam product.

20 Claims, 2 Drawing Sheets

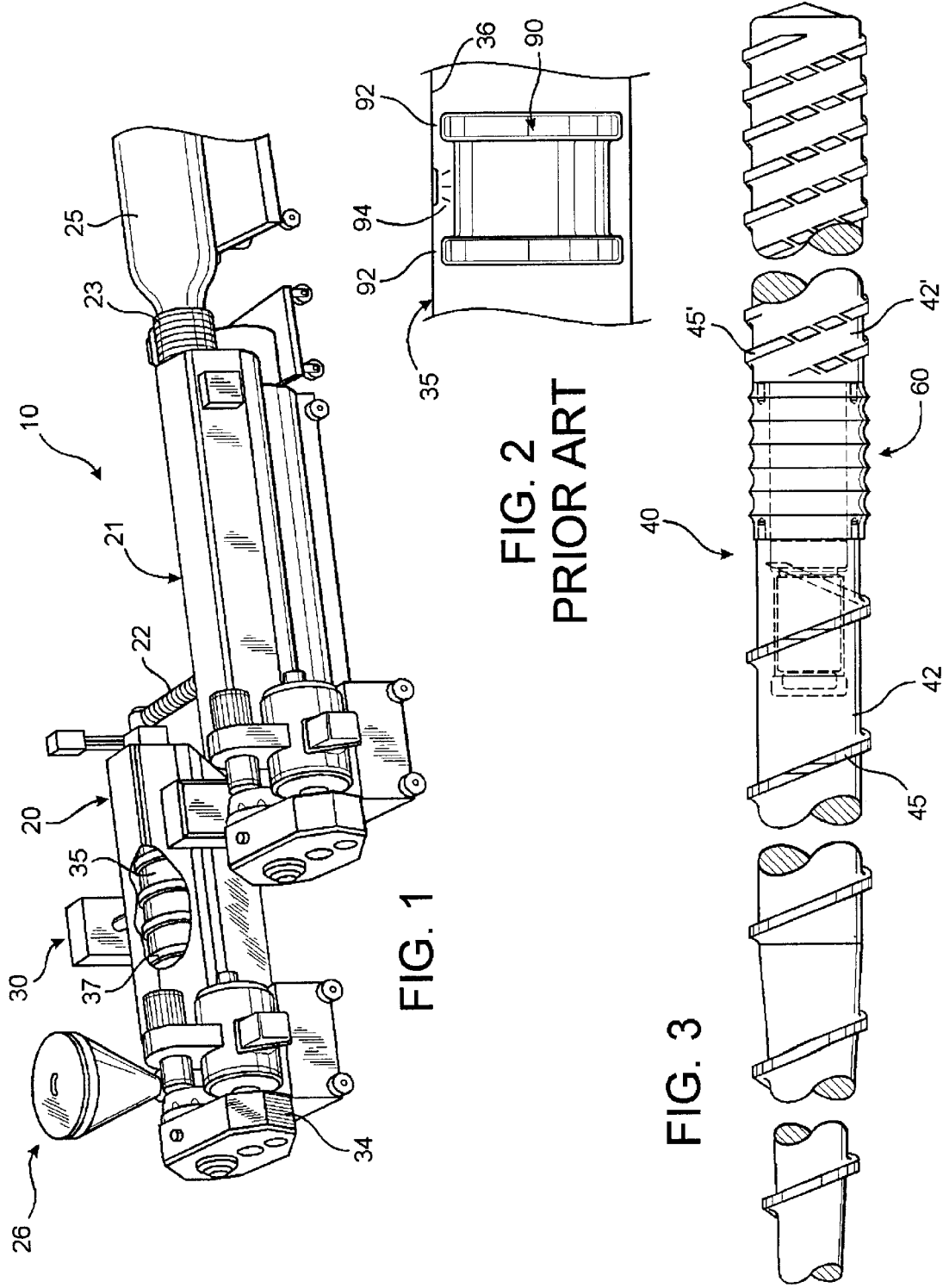

THERMOPLASTIC FOAM EXTRUSION ASSEMBLY

BACKGROUND OF THE INVENTION

1. Field of the Invention

The present invention relates to a thermoplastic extrusion assembly which provides for the effective production of a substantially well blended and homogenized extrusion mixture utilized to form an extruded foam product that contains minimal imperfections, such as from air or gas pockets, in a manner which minimizes potentially hazardous pressure build ups at the mixing assembly and therefore minimizes a pressure drop after mixing which could result in a reduction of the overall through put rate and a production slow down. Moreover, the present invention produces the substantially homogenized extrusion mixture in a manner which does not require complex or costly modifications or alterations to existing foam extrusion manufacturing procedures, while nevertheless increasing the quality of the extruded foam product produced.

2. Description of the Related Art

The field of art associated with thermoplastic extrusion, and particularly thermoplastic foam extrusion is quite specialized, and indeed, is quite different from that typically associated with metal, rubber, or non-foamed plastic extrusion. Specifically, foam extrusion requires an initial step of melting pellets, usually made of a thermoplastic material, and a subsequent step of mixing the melted or melting thermoplastic with a foaming agent, such as a fluorocarbon (CFC, HCFC and HFC) or hydrocarbon (propane, butane, etc.), and possibly other agents, nucleating agents, fire retardants and/or coloring agents, in an isolated extrusion environment, so as to form an extrusion mixture.

Moreover, the most effective foam extrusion techniques completely contain the extrusion mixture during the melting and mixing stages, maintaining the mixture in a non-foamed, viscous form until passed through an extrusion die and exposed to external forces. Indeed, it is when the extrusion mixture exits the die of the foam extrusion assembly that it will foam (i.e. inflate and stiffen) into its ultimately usable form, such as films, planks, and large sheets from which meat trays, egg containers, small containers for butter and jelly, and the like, are formed. Accordingly, precision is imperative in order to ensure that an effective and complete mixing of the ingredients is achieved, thereby providing for a more precisely configured and homogeneous extrusion mixture and product, and further to ensure that the entire extrusion system is well contained until the extrusion mixture passes through the die, thereby avoiding premature foaming of the extrusion mixture.

In addition to the above concerns associated with the formation of a foam product is the need to maintain the extrusion mixture at a rather precise extrusion temperature, corresponding the polymer or substance being used as the basis for the extrusion mixture, so as to achieve a proper viscosity of the extrusion mixture and permit proper forming of the extrusion mixture through a die, such as a profile die, tube die, sheet die, annular die, flat die or several other types common types of dies. The rather precise extrusion temperature at which a desired range of viscosity is achieved is unfortunately, less than the initial "melt temperature", i.e. temperatures at which the pellets of extrusion material are melted, but cannot be too much less than the initial "melt temperature" for reasons about to be explained. As such, a substantial balance must be maintained. For example, if the melted extrusion mixture is permitted to cool too much, it will become too viscous and will fail to achieve the desired product density, becoming unusable, and will generally not effectively move through the extrusion assembly, let alone, out through the die. Conversely, if the temperature of the melted extrusion material is too high, its viscosity decreases significantly and the material is not dimensionally stable or shapeable as it flows through and from the die.

A further important consideration when forming the extrusion mixtures relates to the fact that the plastic material pellets utilized as a basis for the extrusion mixture, when melted, form a generally viscous, smooth liquid, which when infused with the liquid and/or gaseous foaming agent (s), or blends thereof, tends to maintain a plurality of fluid pockets dispersed therethrough, with a low viscosity resulting in the vicinity of the pockets, due to the plasticizing affect of the foaming agent, and a relatively high viscosity resulting in the regions lacking foaming agent. For this reason, it is necessary to achieve proper and complete mixing and blending of the foaming agent(s) with the liquid melted material pellets so as to generally minimize a size of the fluid bubbles contained in the extrusion mixture produced and provide a fuller, more homogeneously dispersed product for foaming. In particular, when the extrusion mixture exits the thermoplastic extrusion assembly, it is typically the foaming agent contained therein which upon being released from the pressurized environment tends to expand the extrusion mixture and causes the extrusion mixture to "foam" into the extruded foam product. Of course, if greater concentrations of the foaming agent are contained in certain portions or in certain pockets throughout the extrusion mixture, non-uniform foaming results, with certain portions foaming more than others, and imperfections in the structure of the extruded foam product, such as from air or gas pockets, are created. As such, the quality of the extruded foam product and the useable quantities of the extruded foam product actually produced are reduced. Furthermore, as the extruded foam product is often formed into large sheets, which are ultimately used for the finished product, imperfections in the sheets of extruded foam product can often significantly complicate or slow down the process of cutting or forming the finished product, as the imperfect or impure areas must be identified, if possible, before or after the formation of the finished product.

An additional concern associated with the foam extrusion process involves the fact that the melting and mixing generally takes place within an enclosed environment such that the addition of a foaming agent(s) tends to increase the pressure within the enclosed extrusion environment. Accordingly, a great degree of care must be undertaken in the mixing process in order to ensure that the steps which are undertaken to provide for substantially homogeneous mixing of the foaming agent(s) with the melted material pellets, does not also result in a potentially dangerous pressure build up at the mixing area of the enclosed environment. For example, such a pressure build up within the enclosed extrusion environment can lead to leaks, ruptures, cracks or other very dangerous breakdowns in the structure of the extrusion assembly after extend periods of use. Moreover, care must also be taken to avoid substantial pressure drops after the mixing area. Typically pressure drops will result from the abrupt release of an extended, restricted flow of the extrusion mixture, such as after an excessive pressure build up, and can significantly disrupt the smooth and effective movement of the extrusion mixture through the assembly and diminish the through put rate achieved so as to result in a drop off in the production rate.

Presently in the art, elongate generally dumbbell shaped structures 90, as illustrated in FIG. 2, are generally provided to ease foaming agent injection by temporarily discontinuing the presence of screw flights and diminishing pressure pulsation at the foaming agent injection hole in the extrusion cylinder, and for the mixing of the melted material pellets and foaming agent(s). In particular, these structures will typically include elongate gapped passages 92 between the structure 90 and the interior surface 36 of the barrel 35 so as to achieve some mixing and disbursement of materials, the gaped passages 92 connecting a single, large central trough 94 at which the foaming agent(s) is typically added to the melted material pellets. Unfortunately, however, such existing mixing structures are often substantially limited in the completeness to which they are able to mix the melted material pellets and the foaming agent(s). In particular, because of the size of the gaps, such existing structures 90 do not achieve effective homogenization, and even if the prior art recognized the benefit of reducing the diameter of the gaps, the gaped passages of the prior art could not be further reduced in size because as the extrusion mixture passes through the elongate gap region 92, a substantial pressure build up entering the structure 90 would result, and once the mixture leaves the structure 90 a substantial pressure drop would also result so that the mixture does not effectively flow and the overall through put rate suffers. Moreover, even with existing structures, the pressure build up can lead to potential ruptures or cracks in the barrel at the mixing point because of the increased pressure resulting from the extended, restricted urging of increased amounts of the extrusion mixture through the elongate gaped passages 92.

As a result, there is a substantial need in the art to provide an extrusion mixing assembly which is safe and effective to utilize, does not provide potentially harmful pressure variations, and does not result in pressure drops that would diminish the production rate of the system, but which also provides a substantially homogenized and substantially highly disbursed extrusion mixture which when passed through a die for forming will achieve a highly uniform and relatively imperfection-free extrusion product.

SUMMARY OF THE INVENTION

The present invention relates to a thermoplastic foam extrusion assembly which is utilized to produce an extrusion mixture that is formed and molded through a die into an extruded foam product in any of a variety of extruded shapes.

Specifically, the foam extrusion assembly of the present invention includes a melt region which receives and melts a plurality of material pellets. Typically, these material pellets will include a plastic material that forms the basis for the foam to be produced. Additionally, the foam extrusion assembly of the present invention includes an agent addition assembly. The agent addition assembly is structured to add one or more foaming agent(s) to the melted material pellets, thereby providing the primary ingredient for the expanded, preferably polymer plastic, foam product to be produced.

Also preferably incorporated with the melt region and the agent addition assembly of the extrusion assembly is an extrusion mixing assembly. Specifically, the mixing assembly is structured to substantially mix the melted material pellets and the foaming agent with one another in order to achieve a substantially homogeneous and uniformly configured extrusion mixture. The preferred mixing assembly of the present invention includes a confined space, such as a generally elongate extrusion barrel. The extrusion barrel, which includes at least one inlet and at least one outlet, is structured to receive the melted material pellet and foaming agent(s) flowably therethrough for passage from the inlet to the outlet. To this end, the mixing assembly includes means to urge the melted material pellets and the foaming agent through the barrel from generally the inlet to the outlet of the barrel.

Disposed within the barrel, at a point generally between the inlet and the outlet of the barrel, is at least one mixing plug. The mixing plug of the extrusion mixing assembly is structured and disposed such that the flow of the melted material pellets and foaming agent being urged through the barrel passes thereover as it moves towards the outlet of the barrel. As such, the mixing plug defines at least two subsequently disposed flow passages positioned along a length thereof. In particular, the flow passages are structured to receive the melted material pellets and the foaming agent therethrough, thereby defining a flow path past the mixing plug.

The extrusion mixing assembly of the present invention is further structured so that at least one transverse dimension of the flow passage defined by the mixing plug is substantially small. Accordingly, the amounts of melted material pellets and foaming agent which can enter each flow passage at one time are substantially restricted, and a substantially homogeneous extrusion mixture of the melted material pellets and the foaming agent passing through the flow passage is achieved. For example, as the mixture enters and passes through the flow passages, larger pockets of the foaming agent can generally not enter the flow passages and are therefore broken down with smaller conglomerations of the foaming agent being disbursed throughout the melted material pellets. As such, substantially homogeneous, evenly disbursed and effective mixing of the foaming agent with the melted material pellets is achieved. Furthermore, the flow passages defined by the mixing plug are also generally short in length, and are disposed spaced apart distances from one another along the length of the mixing plug. Accordingly, a duration of a flow restriction of the extrusion mixture at the flow passages is substantially minimized since the melted material pellets and foaming agents are only present within the restrictive area of the flow passages for a very short period of time. Moreover, such a configuration also minimizes a pressure drop which results from the homogenization of the melted material pellets and the foaming agent as it passes through the flow passages.

Lastly, the preferred foam extrusion assembly of the present invention includes a die structured to receive the homogenized melted material pellets and foaming agent therethrough. Particularly, after effective and substantial mixing of the melted material pellets and the foaming agent is achieved, an extrusion mixture is provided. That extrusion mixture is then preferably provided at a generally precise extrusion temperature, which is not so viscous as to restrict flow through the die, but which is not too liquified and will therefore not form as it passes through the die.

The present invention further includes a method of producing an extrusion mixture which is of substantially high and uniform quality, and which does not result in a substantial pressure drop within the extrusion assembly. Specifically, the method of the present invention includes an initial step of melting a plurality of material pellets and disposing those material pellets in a confined space. Subsequently, a quantity of a foaming agent is added to the quantity of the material pellets within the confined space. Preferably, a plurality of substantially small flow passages are defined in the confined space, and the quantity of melted material pellets and foaming agent is urged through those flow passages in order to substantially homogenize the melted material pellets and the foaming agent with one another, and thereby define the desired extrusion mixture. Indeed, by defining the flow passages in their substantially small configuration, an effective mixing and disbursement of the foaming agent is achieved throughout the melted material pellets, and the uniform extruded foam product can be effectively produced.

It is an object of the present invention to provide a thermoplastic foam extrusion assembly which produces a substantially homogenized and high quality extrusion mixture, without a decrease in productivity rate or a substantial internal pressure drop after mixing.

Yet another object of the present invention is to provide an extrusion mixing assembly which is structured to provide an extrusion mixture of substantially high and homogenized quality and which effectively and evenly disburses liquid and/or gaseous ingredients, such as a foaming agent, through viscous liquid ingredients, such as the melted material pellets.

An additional object of the present invention is to provide an extrusion mixing assembly which can be effectively utilized with existing extrusion assemblies, but which will provide a substantially higher quality extrusion mixture.

Another object of the present invention is to provide an extrusion mixing assembly which minimizes a duration of a flow restriction of the mixture of melted material pellets and foaming agent, thereby minimizing pressure drops which are exhibited within the extrusion assembly.

A further object of the present invention is to provide a extrusion mixing assembly which substantially minimizes the size of foaming agent pockets within the extrusion mixture.

Also an object of the present invention is to provide a method of producing an extrusion mixture which does not significantly decrease production rates, is safe, and produces a highly homogenous and high quality extruded foam product.

An added object of the present invention is to provide a method of producing an extrusion mixture which can be easily and effectively incorporated into existing extrusion assemblies without requiring substantial modification or adjustment to the existing extrusion assembly.

BRIEF DESCRIPTION OF THE DRAWINGS

For a fuller understanding of the nature of the present invention, reference should be had to the following detailed description taken in connection with the accompanying drawings in which:

FIG. 1 is a perspective, partial cutaway view of a preferred foam extrusion assembly of the present invention;

FIG. 2 is a cross section view of a prior art mixing structure;

FIG. 3 is a side view of the extrusion mixing assembly of the present invention included with the elongate screw of the extrusion mixing assembly;

Like reference numerals refer to like parts throughout the several views of the drawings.

DETAILED DESCRIPTION OF THE PREFERRED EMBODIMENT

Figure 4:
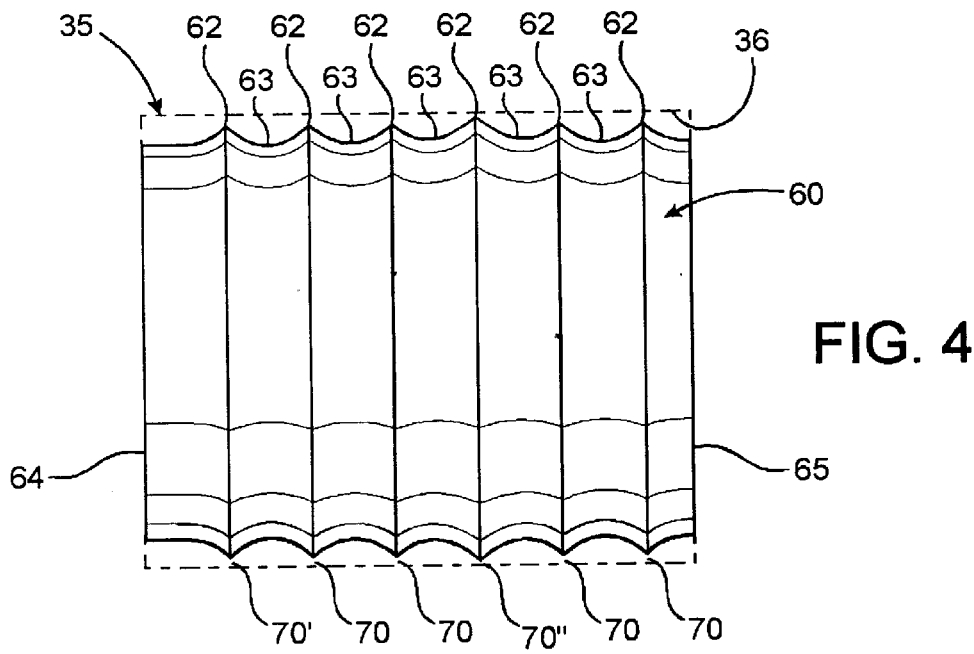
FIG. 4 is a side view of the extrusion mixing assembly of the present invention.
Figure 5:
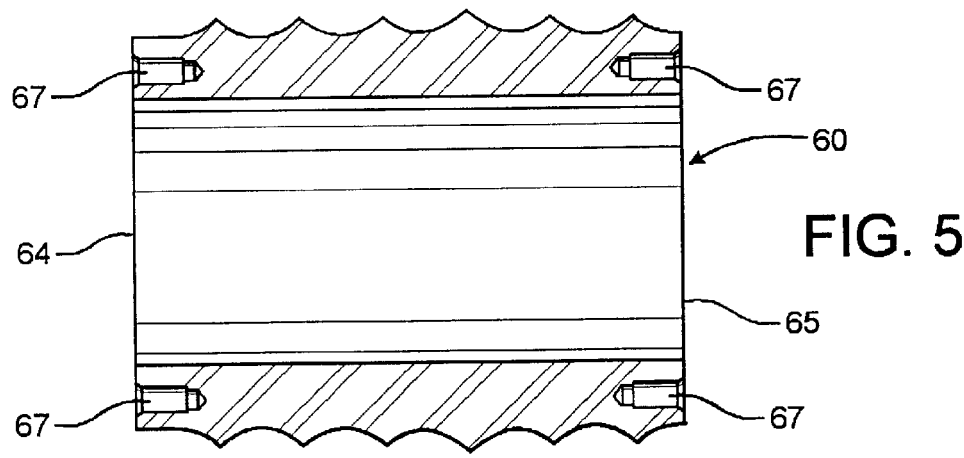
FIG. 5 is a cross section view of the extrusion mixing assembly of the present invention.
Figure 6:
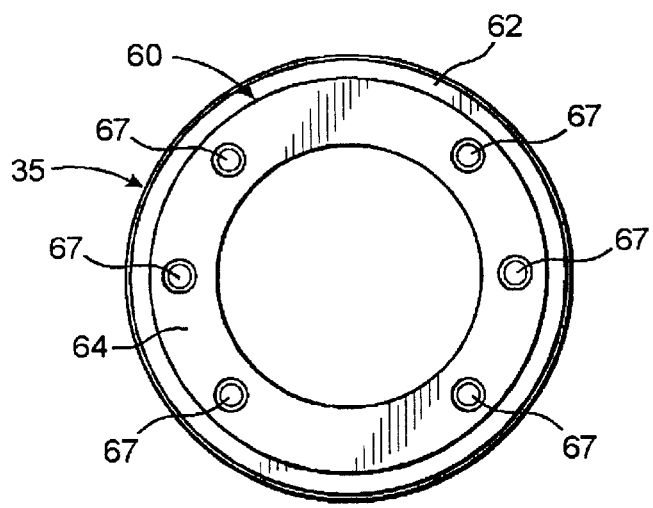
FIG. 6 is an end view of the extrusion mixing assembly of the present invention.

The present invention is directed towards a thermoplastic foam extrusion assembly, as illustrated in FIG. 1 and generally indicated as 10. Specifically, the foam extrusion assembly 10 is structured to produce an expandable polymer plastic which foams upon exposure to an external environment in order to produce a finished or semi-finished product. To this end, the foam extrusion assembly 10 of the present invention may be utilized with a number of thermoplastic polymers, including but not limited to polystyrene, polyethylene (PE), polypropylene, PET or other similar thermoplastics, including foaming or expandable polymer thermoplastics or other materials which may be utilized or developed in the future. As illustrated in FIG. 1, the preferred embodiment of the foam extrusion assembly 10 of the present invention defines a tandem type assembly, although a single, in-line and/or intermeshing twin screw assembly may also be equivalently utilized and should be considered within the scope and intent of the present invention. In particular, the illustrated tandem, foam extrusion assembly 10 includes a first "melt region", generally indicated as 20, and a second "heat extraction" region generally indicated as 21. Of course, in an alternative embodiment, these two regions could be continuous with one another as part of a single elongate structure. For purposes of clarity, however, the preferred tandem assembly shall be described herein.

The first melt region 20 of the preferred embodiment is structured to receive and melt a plurality of material pellets, which preferably form the basis for the extruded foam product to be produced. Further, the preferred embodiment includes a larger funnel type melt inlet 26 wherethrough large quantities of material pellets may be introduced into the melt region 20. Of course, it is noted that the material pellets may include small bead type pellets, larger cubes, blocks or chunks, or any other configuration of the material which can be conveniently introduced into the melt region 20 for subsequent melting thereof. Furthermore, although the melt region 20 may include a large vat or other heating container for direct and immediate melting of the material pellets, in the preferred embodiment, the melt region 20 preferably includes an elongated extrusion barrel 35 through which the material pellets will pass. Specifically, an interior melt screw 40 is preferably contained within the barrel 35 of the melt region 20 and is driven by a large gear assembly 34. As the material pellets are urged through the melt region 20, preferably by at least one screw flight 45 extending about the interior melt screw 40, so as to have essentially a "meatgrinder" effect, at least one heater coil 37, preferably surrounding the wall of the barrel 35 of the melt region 20, applies heat to the barrel 35 and helps melt the material pellets disposed within the barrel 35. Moreover, the screw flight 45 of the interior melt screw 40 contained in the barrel 35 is structured, sized and disposed to precisely correspond the interior surface 36 of the barrel 35, to within very small, precise tolerances, so as to avoid seepage thereover, and so as to urge the material pellets against the interior surface 36 of the barrel 35 causing a shear affect which further adds heat to the material pellets and improves the overall melting thereof until a smooth, yet viscous melted material is provided.

As the material pellets alone will generally not provide the necessary foaming reaction when hardening and will not become the desired finished foam product, the foam extrusion assembly 10 further includes an agent addition assembly 30. In the preferred embodiment, the agent addition assembly 30 adds one or more foaming agents to the melted material pellets, preferably as they pass through the barrel 35 of the melt region 20. Moreover, in the preferred embodiment, the foaming agent may include fluorocarbon, hydro carbon, or another equivalent liquid or gaseous foaming agents which will add volume to the finished extruded foam product 25 and will promote the foaming reaction when the extrusion mixture emerges from the foam extrusion assembly 10. Of course, it is understood that other foaming agents may also be developed or provided in the future depending upon the desired finished product. Further, if desired, and preferably along with the agent addition assembly 30, a coloring agent or a nucleating agent may also be added to the material pellets being melted.

Also included in the preferred extrusion assembly 10 of the present invention, and preferably included with the melt region 20, is an extrusion mixing assembly. In the preferred embodiment, the extrusion mixing assembly is integrated with and incorporates at least some of the previously described structures of the melt region 20, and is structured to substantially mix the melted material pellets and the foaming agent with one another into a substantially homogeneous and well blended extrusion mixture. In particular, the extrusion mixing assembly includes a confined space through which the melted material pellets and foaming agent flow for mixing. In the preferred embodiment, the confined space includes the generally elongate barrel 35 wherein the melting and the addition of the foaming agent(s) also takes place, as previously recited. Further, so as to provide for effective passage through the barrel 35, the barrel includes at least one inlet 26, such as the funnel type melt inlet through with the material pellets are loaded, and at least one outlet 22, such as a connection conduit between the preferred tandem sections of the extrusion assembly, as will be described in greater detail subsequently, or alternatively an extrusion outlet or transition area leading to a cooling stage within a single barrel system. Additionally, so as to provide movement of the melted material pellets and the foaming agent through the elongate barrel 35, a means to urge the extrusion mixture through the barrel 35 is provided. In the preferred embodiment, the elongate screw 40 that serves to assist with the melting of the melted material pellets also functions to provide the pushing movement of the extrusion mixture.

Also included as part of the extrusion mixing assembly, and preferably disposed at a point generally between the inlet 26 and the outlet 22 of the barrel 35, is at least one mixing plug 60. The mixing plug 60 is preferably contained within the barrel 35 and may be structured to rotate within the barrel. In this regard, the mixing plug 60, which generally includes an upstream end 64 and a downstream end 65 can be included as part of the elongate screw 40 that is structured to rotate within the barrel 35. Specifically, the mixing plug 60 may be integrally formed with the elongate screw 40, or can be a separately coupled element, as illustrated in FIG. 3 of the preferred embodiment. For example, the mixing plug 60 of the preferred embodiment may include one or a plurality of alignment and/or connection elements 67 at its upstream end 64 and/or its downstream end 65 and structured to mate with corresponding elements on the upstream and/or downstream portions 42 and 42' of the elongate screw 40. In this regard, fastening such as by screws, splines or press fitting pegs may be incorporated. Moreover, if a sufficient seal and fitted engagement is provided within the elongate barrel 35, merely mating engagement between one or more connection elements 67 and corresponding pins or guides disposed on the upstream and/or downstream shaft portions 42 and 42' of the elongate screw 40 may be provided. As such, as the elongate screw 40 rotates, an upstream screw flight 45 urges the melted material pellets and the foaming agent past the mixing plug 60, and the downstream screw flight 45' continues the movement of the fully mixed, extrusion mixture towards the outlet 22. It is also noted that the foaming agent(s) may be added to the melted materia pellets either at or before the mixing plug 60. If added at the mixing plug 60 it is generally preferred that it be added at a point wherein a sufficient length of the mixing plug 60 still must be passed over, thereby still effectively homogenizing the mixture.

Looking in greater detail to the preferred embodiment of the mixing plug 60 of the present invention, it is structured to define at least two, but preferably a plurality of sequentially disposed flow passages 70 along a length thereof. As illustrated in FIG. 4, the flow passages 70 are structured and disposed to receive the melted material pellets and foaming agent therethrough and as a whole define a flow path past the mixing plug 60. In the preferred embodiment, the mixing plug 60 includes at least two, but preferably a plurality of ridges 62 positioned a spaced apart distance from one another, and extending at least partially, but preferably completely about the mixing plug 60. Accordingly, the preferred flow passages 70 are generally defined between the ridges 62 and the interior surface 36 of the barrel 35 completely around the preferably round mixing plug 60. Of course, it is noted that the flow passages 70 may only extend partially about a perimeter of the mixing plug 60, and alternative configurations of the flow passages 70, such as defined completely within the structure of the mixing plug 60 in one or more different orientations may also be provided. Nevertheless, the flow passages 70 are structured to be sequentially disposed a generally spaced apart distance from one another along a length of the mixing plug 60, and are generally short in length so as to minimize a duration of the flow restriction exhibited at the flow passages 70 and to thereby minimize a pressure drop which results from the homogenization of the melted material pellets and the foaming agent as it passes through the flow passages 70 and upon passage of the extrusion mixture from the mixing plug 60. In particular, and as illustrated in the Figures, the ridges 62 preferably include a peaked configuration with a sloped configuration at opposite sides leading to the apex of the ridges 62. As a result, the overall length of each of the flow passages 70 over the mixing plug 60 is substantially short, extending only the length of the apex of the ridges 62, and the slope configuration provides a series of troughs 63 after each flow passage 70, thereby almost immediately decreasing the flow restriction until the next flow passage 70 is reached.

The flow passages 70 of the present invention are further defined with at least one transverse dimension thereof being substantially small. In particular, the small transverse dimension may include a height or width of the flow passages 70, and is generally a dimension perpendicular to the previously recited length of the flow passages 70. For example, while the preferred embodiments illustrated in the Figures provide for the transverse dimension with the substantially small dimension to be a diametric dimension such that the flow of melted material pellets and foaming agent are squeezed about a perimeter of the mixing plug 60, it is also contemplated that other configurations of flow passages such as radially extending, substantially narrow channels, may also be provided. Nevertheless, due to the substantially small transverse dimension of the flow passages 70, as the melted material pellets and the foaming agent are urged into and through the flow passages 70, the specific amounts and density of melted material pellets and foaming agent which can enter each flow passage 70 at one time is substantially restricted and the melted material pellets and foaming agent are disbursed and substantially homogenized with one another as they pass through the flow passages 70. For example, if a large volume of melted material pellets or foaming agent cannot pass through the flow passages 70 at one time, as the materials are squeezed through the flow passages 70 there is a general disbursement of the materials throughout one another as the material permitted to enter and pass through flow passages 70 is rendered into a fine substantially homogenized extrusion mixture.

So as to provide for progressively increased homogenization of the melted material pellets and the foaming agent with one another, and without providing too severe a flow restriction when the melted material pellets and foaming agent are in their most separated and unmixed state, in the preferred embodiment of the present invention, the flow through area of preferably each sequentially disposed one of the flow passages 70 is smaller than at least one of the previously disposed, upstream flow passages 70. In particular, and as best illustrated in FIG. 4, preferably the small transverse dimension of an upstream one of the flow passages 70' is larger than that transverse dimension of at least one down stream one of the flow passages 70", thereby gradually decreasing the size of the materials that can pass through the flow passage and increasing the homogenization of the melted material pellets and the foaming agent with one another as they flows past the mixing plug 60. Of course, while in the preferred embodiment it is the select, small transverse dimension that becomes increasingly smaller, so long as the general size and flow through area of an up stream one of the flow passages 70' is generally larger than that of least one of the down stream flow passages 70" the gradual increase in homogenization may be achieved. Moreover, while the preferred embodiment of the present invention provides for sequential decreasing of the size of the flow passages 70, it is also contemplated that after some reduction in the size of the flow passages 70 has resulted, a subsequent increase in further flow passages may follow. For example, the size of the flow passages 70 need not get smaller from one flow passage to the next, although that is the preferred embodiment, so long as there is at least one general decrease in overall transverse dimension of the flow passages 70 as the melted material pellets and foaming agent flow downstream past the mixing plug 60. Accordingly, substantially unlike the prior art mixing structures 90, as illustrated in FIG. 2, the extrusion mixture passes quickly through a substantially more restricted flow passage 70 rather than requiring extensive passage through an elongate gaped passage 92.

As previously recited with regard to the preferred tandem assembly illustrated, the outlet end 22 of the barrel 35 of melt region 20, preferably includes a connection conduit 22. In this regard, the connection conduit 22 of the preferred tandem type extrusion assembly 10 preferably leads out from the melt region 20 and into a heat extraction region 21 which may be included as a separate structure 21 or could merely be a continuation of the melt region 20 as is the case with the long single screw or intermeshing twin screw systems. The heat extraction region 21, which may also include an elongate screw therein is structured to further process the homogenized extrusion mixture so as to uniformly extract excess heat therefrom until the mixture attains an appropriate extrudable temperature. In the preferred embodiment, the heat extraction region includes a cooling assembly which draws heat from the flowing extrusion mixture and may also include further mixing as the materials are being urged therethrough by the screw towards a die 23. Specifically, the cooled extrusion mixture at the extrudable temperature is pushed through the die 23 and the extruded foam product 25 is thereby formed.

The extrusion mixing assembly 10 of the present invention is also provided as part of a method of producing an extrusion mixture. Specifically, the method of producing the extrusion mixture includes an initial step of melting a plurality of the material pellets and disposing the quantity of melted material pellets in a confined space, such as an extrusion barrel 35. Once in that confined space, a quantity of a foaming agent is added to the quantity of material pellets.

Preferably by disposing a mixing plug within the confined space or barrel 35, the present method further calls for defining a plurality of substantially small flow passages 70 in the confined space. Moreover, those substantially small flow passages 70 are preferably defined so as to be substantially short in length and so as to have at least one transverse dimension be substantially small. As such, and as preferably a final step, the quantity of melted material pellets and foaming agent are urged through the flow passages 70 defined in the confined space so as to substantially homogenize the melted material pellets and foaming agent with one another and thereby define the extrusion mixture. Furthermore, the quantity of melted material pellets and foaming agent are urged through the substantially short flow passages 70 such that a pressure drop exhibited during restriction of the flow is minimized, and through a substantially small transverse dimension so that the amount of melted material pellets and the foaming agent which enter the flow passages 70 at one time is restricted and the foaming agent and melted material pellets are substantially homogenized with one another. Of course, to further this homogenization, all or some of the flow passages 70 may become sequentially smaller in the transverse dimension, thereby gradually increasing the degree of homogenization to be achieved as the melted material pellets and foaming agent flow past the mixing plug 60.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A foam extrusion assembly comprising:
   a) a melt region structured to receive and melt a plurality of material pellets;
   b) an agent addition assembly structured to add a foaming agent to said melted material pellets;
   c) a mixing assembly structured to substantially mix said melted material pellets and said foaming agent, said mixing assembly comprising:
   a generally elongate barrel having at least one inlet and at least one outlet;
   at least one mixing plug disposed in said barrel at a point generally between said inlet and said outlet of said barrel,
   said mixing plug defining at least two sequentially disposed flow passages along a length thereof, said flow passages being structured and disposed to receive said melted material pellets and said foaming agent therethrough so as to define a flow path past said mixing plug, a flow through area of each of said flow passages being substantially small so as to restrict amounts of said melted material pellets and said foaming agent which enter said flow passage at one time and to thereby substantially homogenize said melted material pellets and said foaming agent passing therethrough with one another, and said flow through area of an upstream one of said flow passages being larger than said flow through area of at least one downstream one of said flow passages disposed along said mixing plug;

d) a die structured to receive a homogenized mixture of said melted material pellets and said foaming agent therethrough at an extrudable temperature; and e) said flow through area of at least two of said downstream ones of said flow passages being sequentially smaller than one another and said flow through area of said upstream one of said flow passages.

2. A foam extrusion assembly as recited in claim 1 wherein said mixing plug includes at least two ridges disposed a spaced apart distance from one another and extending at least partially about a perimeter of said mixing plug, each of said ridges being disposed in closely spaced relation with an interior surface of said barrel so as to define at least one of said flow passages between said ridge and said barrel.

3. A foam extrusion assembly as recited in claim 2 wherein said ridges extend completely about said perimeter of said mixing plug and define said flow passages completely about said perimeter of said mixing plug.

4. A foam extrusion assembly as recited in claim 2 wherein said ridges include a generally sloped configuration so as to define a trough region between adjacently disposed ones of said ridges.

5. A foam extrusion assembly as recited in claim 2 wherein said ridges include a generally peaked configuration such that an apex of said ridge defines said substantially short in length flow passage with said interior surface of said barrel.

6. A foam extrusion assembly as recited in claim 1 including a plurality of said flow passages disposed along said length of said mixing plug.

7. A foam extrusion assembly as recited in claim 1 wherein said mixing plug is structured to rotate within said barrel.

8. A foam extrusion assembly as recited in claim 1 wherein said melt region includes said barrel and an elongate screw rotatably disposed therein.

9. A foam extrusion assembly as recited in claim 8 wherein said elongate screw is coupled with said mixing plug.

10. A foam extrusion assembly as recited in claim 8 wherein said elongate screw further defines means to urge said melted material pellets and said foaming agent through said barrel.

11. A foam extrusion assembly as recited in claim 1 wherein said agent addition assembly is structured to add said foaming agent to said melted material pellets at said mixing assembly.

12. A foam extrusion assembly as recited in claim 1 further including a heat extraction region structured to extract excess heat from said homogenized mixture of melted material pellets and foaming agent such that said homogenized mixture of melted material pellets and foaming agent attains said extrudable temperature.

13. An extrusion material mixing assembly comprising:

a confined space, said confined space including at least one inlet and at least one outlet, and being structured to contain a quantity of melted material pellets and a foaming agent, at least one mixing plug disposed in said confined space at a point generally between said inlet and said outlet of said confined space;

said mixing plug defining at least two sequentially disposed flow passages along a length thereof, said flow passages being structured and disposed to receive said melted material pellets and said foaming agent therethrough so as to define a flow path past said mixing plug;

a flow through area of each of said flow passages being substantially small so as to restrict amounts of said melted material pellets and said foaming agent which enter said flow passage at one time and to thereby substantially homogenize said melted material pellets and said foaming agent passing therethrough with one another;

said flow passages being generally short in length and being disposed a spaced apart distance from one another along said length of said mixing plug so as to minimize a duration of a flow restriction at said flow passages and thereby minimize a pressure drop which results from said homogenization of said melted material pellets and said foaming agent; and e) said flow through area of at least two of said downstream ones of said flow passages being sequentially smaller than one another and said flow through area of said upstream one of said flow passages.

14. A extrusion mixing assembly as recited in claim 13 wherein said mixing plug includes at least two ridges disposed a spaced apart distance from one another and extending at least partially about a perimeter of said mixing plug, each of said ridges being disposed in closely spaced relation with an interior surface of said confined space so as to define at least one of said flow passages between said ridge and said confined space.

15. A extrusion mixing assembly as recited in claim 14 wherein said ridges include a generally sloped configuration so as to define a trough region between adjacently disposed ones of said ridges.

16. A extrusion mixing assembly as recited in claim 13 wherein said flow through area of an upstream one of said flow passages is larger than said flow through area of at least one downstream one of said flow passages disposed along said mixing plug so as to increase a homogenization of said melted material pellets and said foaming agent as it flows past said mixing plug.

17. An extrusion material mixing assembly comprising:

a confined space, said confined space including at least one inlet and at least one outlet, and being structured to contain a quantity of melted material pellets and a foaming agent, at least one mixing plug disposed in said confined space at a point generally between said inlet and said outlet of said confined space;

said mixing plug defining at least two sequentially disposed flow passages along a length thereof, said flow passages being structured and disposed to receive said melted material pellets and said foaming agent therethrough so as to define a flow path past said mixing plug;

said flow passages being substantially radially narrow so as to restrict amounts of said melted material pellets and said foaming agent which enter said flow passage at one time and to thereby substantially homogenize said melted material pellets and said foaming agent passing therethrough with one another;

said flow passages being generally short in length and being disposed a spaced apart distance from one another along said length of said mixing plug so as to minimize a duration of a flow restriction at said flow passages and thereby minimize a pressure drop which results from said homogenization of said melted material pellets and said foaming agent; and e) a flow through area of at least two of said downstream ones of said flow passages being sequentially smaller than one another and said flow through area of said upstream one of said flow passages.

18. An extrusion material mixing assembly comprising:

a confined space, said confined space including at least one inlet and at least one outlet, and being structured to contain a quantity of melted material pellets and a foaming agent, at least one mixing plug disposed in said confined space at a point generally between said inlet and said outlet of said confined space;

said mixing plug defining at least two sequentially disposed flow passages along a length thereof, said flow passages being structured and disposed to receive said melted material pellets and said foaming agent therethrough so as to define a flow path past said mixing plug;

said flow passages being radially narrow so as to restrict amounts of said melted material pellets and said foaming agent which enter said flow passage at one time and to thereby substantially homogenize said melted material pellets and said foaming agent passing therethrough with one another; and a downstream one of said flow passages being narrower than an upstream one of said flow passages; and at least three of said flow passages, said flow passages being sequentially radially narrower than one another from an upstream side of said mixing plug towards a downstream side of said mixing plug.

19. An extrusion material mixing assembly comprising:

an elongate barrel, said elongate barrel including at least one inlet and at least one outlet, and being structured to contain a quantity of melted material pellets and a foaming agent, at least one mixing plug disposed in said elongate barrel at a point generally between said inlet and said outlet of said elongate barrel space;

said mixing plug including at least three annular ridges disposed circumferencially thereabout and defining at least three sequentially disposed flow passages between a peak of each of said ridges and a confronting surface, said flow passages being structured and disposed to receive said melted material pellets and said foaming agent therethrough so as to define a flow path past said mixing plug;

said flow passages being substantially radially narrow so as to restrict amounts of said melted material pellets and said foaming agent which enter said flow passage at one time and to thereby substantially homogenize said melted material pellets and said foaming agent passing therethrough with one another; and said flow passages being sequentially narrower than one another from an upstream side towards a downstream side of said mixing plug.

20. An extrusion material mixing assembly comprising:

an elongate barrel, said elongate barrel including at least one inlet and at least one outlet, and being structured to contain a quantity of melted material pellets and a foaming agent, at least one mixing plug disposed in said elongate barrel at a point generally between said inlet and said outlet of said elongate barrel space;

said mixing plug including at least three annular ridges disposed circumferencially thereabout and defining at least three sequentially disposed flow passages between a peak of each of said annular ridges and a confronting surface, said flow passages being structured and disposed to receive said melted material pellets and said foaming agent therethrough so as to define a flow path past said mixing plug;

said flow passages being substantially radially narrow so as to restrict amounts of said melted material pellets and said foaming agent which enter said flow passage at one time and to thereby substantially homogenize said melted material pellets and said foaming agent passing therethrough with one another; and said annular ridges being substantially pointed towards said confronting surface such that said flow passages are generally short in length so as to minimize a duration of a flow restriction at said flow passages and thereby minimize a pressure drop which results from said homogenization of said melted material pellets and said foaming agent.

* * * * *